US009947354B1

(12) United States Patent
Harper

(10) Patent No.: US 9,947,354 B1
(45) Date of Patent: Apr. 17, 2018

(54) UTILIZATION OF MULTIPLE WRITER MODULES FOR SIMULTANEOUSLY WRITING TWO TIMES THE NUMBER OF DATA TRACKS IN A COMPACT FORM FACTOR

(71) Applicant: International Business Machines Corporation, Armonk, NY (US)

(72) Inventor: David H. F. Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/464,081

(22) Filed: Mar. 20, 2017

(51) Int. Cl.
*G11B 5/56* (2006.01)
*G11B 5/008* (2006.01)
*G11B 5/29* (2006.01)
*G11B 5/55* (2006.01)

(52) U.S. Cl.
CPC ............ *G11B 5/56* (2013.01); *G11B 5/00813* (2013.01); *G11B 5/29* (2013.01); *G11B 5/5504* (2013.01)

(58) Field of Classification Search
CPC ............ G11B 5/29; G11B 5/5504; G11B 5/56
USPC ...................... 360/261.1, 291, 121
See application file for complete search history.

(56) References Cited

U.S. PATENT DOCUMENTS

| 5,021,906 | A | 6/1991 | Chang et al. |
|---|---|---|---|
| 5,636,088 | A | 6/1997 | Yamamoto et al. |
| 5,982,592 | A | 11/1999 | Saito et al. |
| 6,188,532 | B1 * | 2/2001 | Albrecht ............ G11B 5/00878 360/251.1 |
| 6,222,698 | B1 | 4/2001 | Barndt et al. |
| 6,246,552 | B1 | 6/2001 | Soeno et al. |
| 6,611,399 | B1 | 8/2003 | Mei et al. |
| 6,757,128 | B2 | 6/2004 | Yip |
| 6,771,456 | B2 | 8/2004 | Winarski et al. |
| 7,054,093 | B1 * | 5/2006 | Anderson ............ G11B 5/584 360/75 |
| 7,068,473 | B2 | 6/2006 | O'Neill |
| 7,193,812 | B2 | 3/2007 | Eaton |
| 7,239,465 | B1 | 7/2007 | Watson et al. |
| 7,301,724 | B2 | 11/2007 | Brittenham |
| 7,342,738 | B1 | 3/2008 | Anderson et al. |
| 7,342,748 | B2 * | 3/2008 | Yip .................... G11B 5/00826 360/241.1 |
| 7,393,066 | B2 | 7/2008 | Dugas et al. |
| 7,414,811 | B2 | 8/2008 | Biskeborn |
| 7,474,495 | B2 | 1/2009 | Weng et al. |

(Continued)

FOREIGN PATENT DOCUMENTS

WO    2010044784 A1    4/2010

OTHER PUBLICATIONS

Non-Final Office Action from U.S. Appl. No. 13/026,142, dated May 9, 2013.

(Continued)

*Primary Examiner* — Jefferson Evans
(74) *Attorney, Agent, or Firm* — Zilka-Kotab, P.C.

(57) ABSTRACT

In one general embodiment, an apparatus includes a first outer module having an array of writers, a second outer module having an array of writers, an inner module positioned between the outer modules, and a first actuator for shifting the first outer module. The shifting is relative to the inner module, in a cross-track direction by about one half of a center-to-center pitch of the writers of the first outer module. The inner module has an array of readers.

19 Claims, 12 Drawing Sheets

(56) References Cited

U.S. PATENT DOCUMENTS

| | | | |
|---|---|---|---|
| 7,486,464 | B2 | 2/2009 | Saliba |
| 7,505,221 | B2 | 3/2009 | Watson |
| 7,529,060 | B2 | 5/2009 | Simmons, Jr. et al. |
| 7,570,450 | B2 | 8/2009 | Koeppe |
| 7,630,173 | B2 * | 12/2009 | Biskeborn .............. G11B 5/105 360/121 |
| 7,738,212 | B2 | 6/2010 | Saliba et al. |
| 7,764,460 | B2 | 7/2010 | Bates et al. |
| 8,144,424 | B2 | 3/2012 | Dugas et al. |
| 8,184,394 | B2 | 5/2012 | Poorman et al. |
| 8,310,778 | B2 | 11/2012 | Biskebom et al. |
| 8,773,810 | B2 | 7/2014 | Biskeborn et al. |
| 8,797,683 | B2 * | 8/2014 | Biskeborn .............. G11B 5/0083 360/121 |
| 8,804,270 | B2 | 8/2014 | Hamidi et al. |
| 9,251,828 | B2 * | 2/2016 | Cherubini .............. G11B 5/584 |
| 9,607,639 | B2 * | 3/2017 | Biskeborn .............. G11B 5/588 |
| 2003/0227702 | A1 * | 12/2003 | Watson ................ G11B 5/4969 360/53 |
| 2004/0109261 | A1 | 6/2004 | Dugas |
| 2004/0240113 | A1 * | 12/2004 | Johnson ............... G11B 5/1871 360/221 |
| 2005/0007700 | A1 * | 1/2005 | Nagai .................... G11B 5/584 360/241.1 |
| 2005/0122623 | A1 * | 6/2005 | Dee ........................ G11B 5/29 360/121 |
| 2005/0152067 | A1 * | 7/2005 | Yip ..................... G11B 5/00826 360/241.1 |
| 2005/0259364 | A1 | 11/2005 | Yip |
| 2008/0158720 | A1 * | 7/2008 | Watson .............. G11B 5/00826 360/77.12 |
| 2008/0186610 | A1 | 8/2008 | Bui et al. |
| 2008/0218891 | A1 | 9/2008 | Gubbins et al. |
| 2008/0239559 | A1 | 10/2008 | Goker et al. |
| 2009/0174963 | A1 * | 7/2009 | Liang ................. G11B 5/00852 360/77.12 |
| 2009/0316296 | A1 * | 12/2009 | Cherubini ................ G11B 5/58 360/76 |
| 2010/0067139 | A1 | 3/2010 | Bates et al. |
| 2011/0141604 | A1 | 6/2011 | Dugas et al. |
| 2012/0188665 | A1 | 7/2012 | Biskebom et al. |
| 2012/0206832 | A1 | 8/2012 | Hamidi et al. |

OTHER PUBLICATIONS

Final Office Action from U.S. Appl. No. 13/026,142, dated Sep. 25, 2013.
Notice of Allowance from U.S. Appl. No. 13/026,142, dated Mar. 31, 2014.
Biskebom et al., U.S. Appl. No. 13/010,731, filed Jan. 20, 2011.
Hamidi et al., U.S. Appl. No. 13/026,142, filed Feb. 11, 2011.
Notice of Allowance and Fee(s) Due from U.S. Appl. No. 13/010,731 dated Feb. 28, 2014.
Final Office Action from U.S. Appl. No. 13/010,731 dated Aug. 8, 2013.
Non-Final Office Action from U.S. Appl. No. 13/010,731 dated Mar. 6, 2013.
Biskeborn et al., U.S. Appl. No. 15/273,508, filed Sep. 22, 2016.
Restriction Requirement from U.S. Appl. No. 15/273,483, dated Jan. 26, 2017.
Biskeborn et al., U.S. Appl. No. 15/273,483, filed Sep. 22, 2016.
Yang et al., "Approaches to Tilted Magnetic Recording for Extremely High Areal Density," IEEE Transactions of Magnetics, vol. 39, No. 4, 2003, pp. 1930-1935.
Lim et al., "Perpendicular Magnetic Recording Process Using Finite-Element Micromagnetic Simulation," IEEE Transactions on Magnetics, vol. 42, No. 10, 2006, pp. 3213-3215.

* cited by examiner

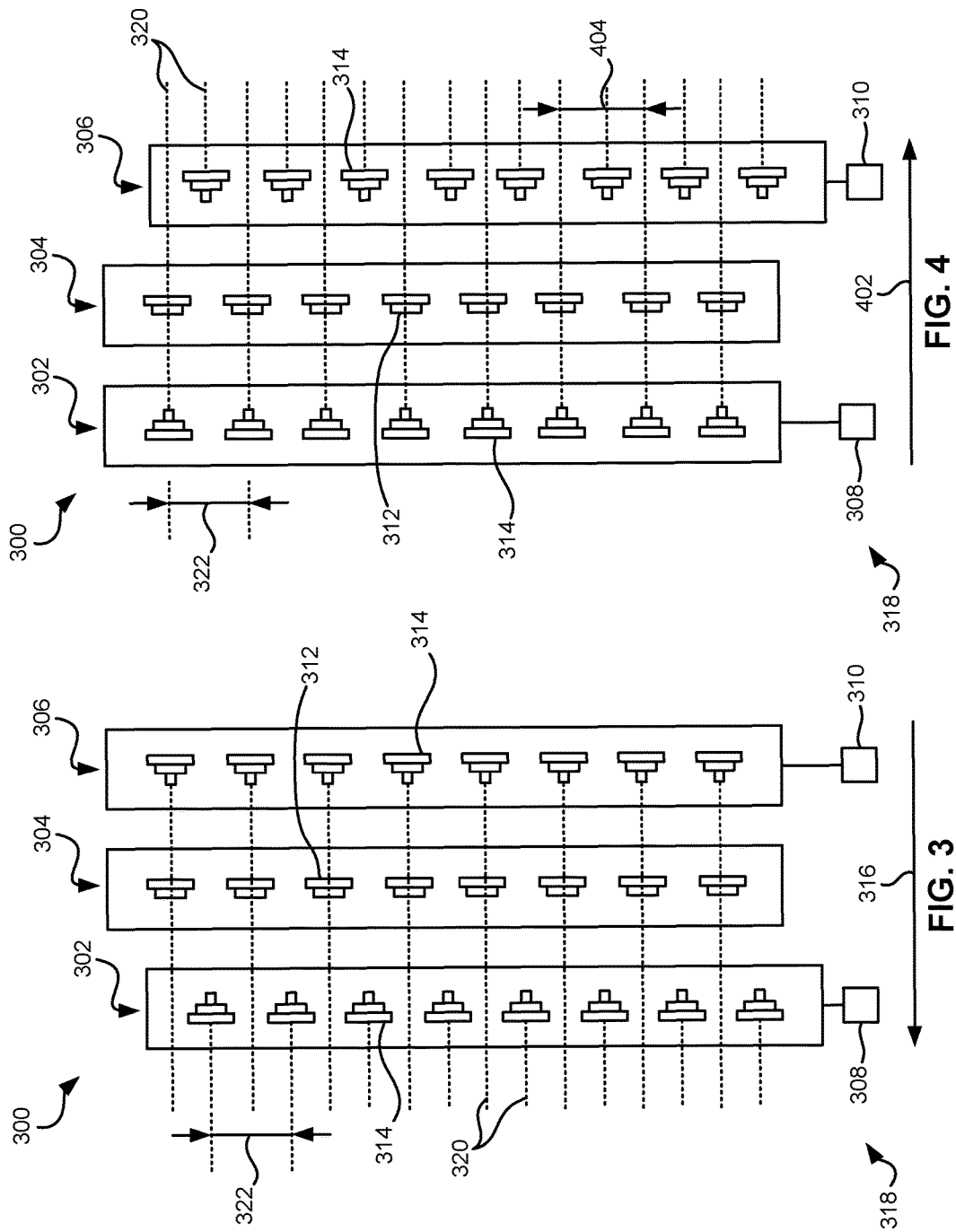

UTILIZATION OF MULTIPLE WRITER MODULES FOR SIMULTANEOUSLY WRITING TWO TIMES THE NUMBER OF DATA TRACKS IN A COMPACT FORM FACTOR

BACKGROUND

The present invention relates to data storage systems, and more particularly, this invention relates to the selective shifting of modules of a magnetic recording head to enable simultaneous writing by writers of different write modules to different data tracks.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a first outer module having an array of writers, a second outer module having an array of writers, an inner module positioned between the outer modules, and a first actuator for shifting the first outer module. The shifting is relative to the inner module, in a cross-track direction by about one half of a center-to-center pitch of the writers of the first outer module. The inner module has an array of readers.

An apparatus according to another embodiment includes a first outer module having an array of writers, a second outer module having an array of writers, an inner module positioned between the outer modules, and an actuator for shifting the inner module. The shifting is relative to the outer modules, for selectively aligning the readers with the writers of the outer modules depending on tape travel direction. The writers of the second outer module being offset from the writers of the first outer module in a cross-track direction by about one half of a center-to-center pitch of the writers of the second outer module, positions of the first and second outer modules being fixed relative to one another. The inner module has an array of readers.

A tape drive-implemented method may be implemented in a tape drive having at least a first outer module having an array of writers, a second outer module having an array of writers, and an inner module positioned between the outer modules, the inner module having an array of readers, according to one embodiment. The method includes shifting at least one of the modules by about one half of a center-to-center pitch of the readers of the inner module, and simultaneously writing a plurality of data tracks on a magnetic recording tape using the outer modules. The data tracks written by a trailing one of the outer modules are offset in a cross-track direction from the data tracks written by a leading one of the outer modules.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration, where one of the outer modules is shifted via an actuator, in accordance with one embodiment.

FIG. 4 is a partial tape bearing surface view of the magnetic head of FIG. 3 where the other outer module is shifted via an actuator.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of increasing simultaneous writing capacity in a magnetic storage system, as well as operation and/or component parts thereof.

In one general embodiment, an apparatus includes a first outer module having an array of writers, a second outer module having an array of writers, an inner module positioned between the outer modules, and a first actuator for shifting the first outer module. The shifting is relative to the inner module, in a cross-track direction by about one half of a center-to-center pitch of the writers of the first outer module. The inner module has an array of readers.

In another general embodiment, an apparatus includes a first outer module having an array of writers, a second outer module having an array of writers, an inner module positioned between the outer modules, and an actuator for shifting the inner module. The shifting is relative to the outer modules, for selectively aligning the readers with the writers of the outer modules depending on tape travel direction. The writers of the second outer module being offset from the writers of the first outer module in a cross-track direction by about one half of a center-to-center pitch of the writers of the second outer module, positions of the first and second outer modules being fixed relative to one another. The inner module has an array of readers.

In yet another general embodiment, a tape drive-implemented method may be implemented in a tape drive having at least a first outer module having an array of writers, a second outer module having an array of writers, and an inner module positioned between the outer modules, the inner module having an array of readers. The method includes shifting at least one of the modules by about one half of a center-to-center pitch of the readers of the inner module, and simultaneously writing a plurality of data tracks on a magnetic recording tape using the outer modules. The data tracks written by a trailing one of the outer modules are offset in a cross-track direction from the data tracks written by a leading one of the outer modules.

Figure 1A:
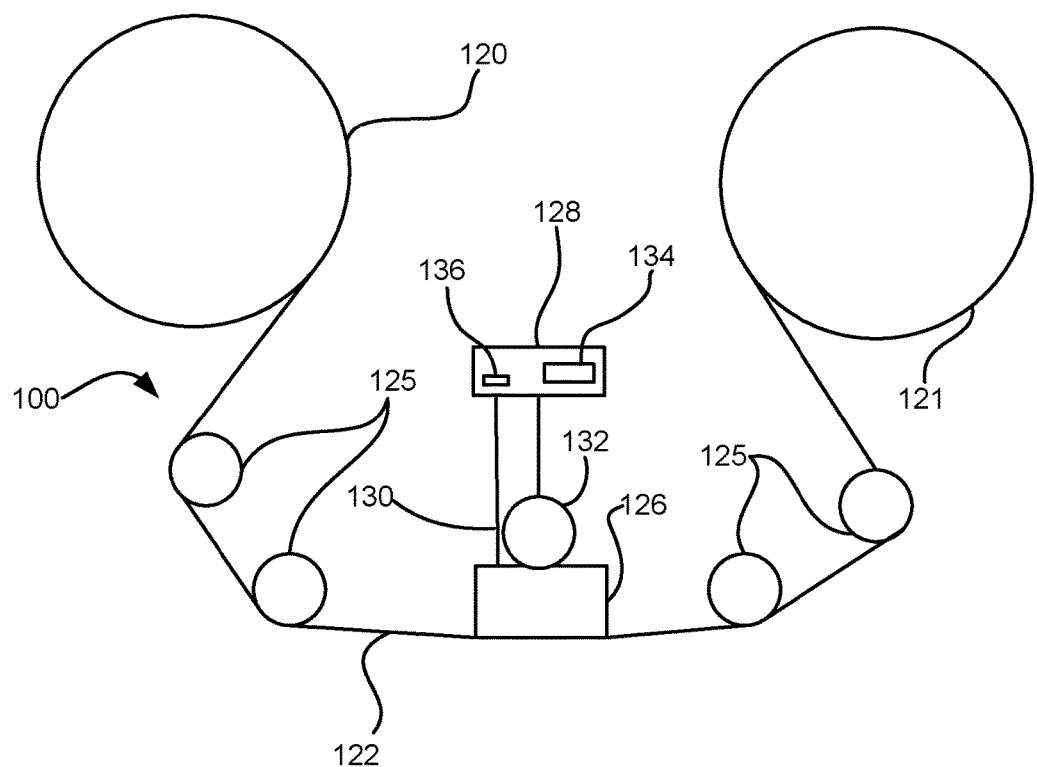
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
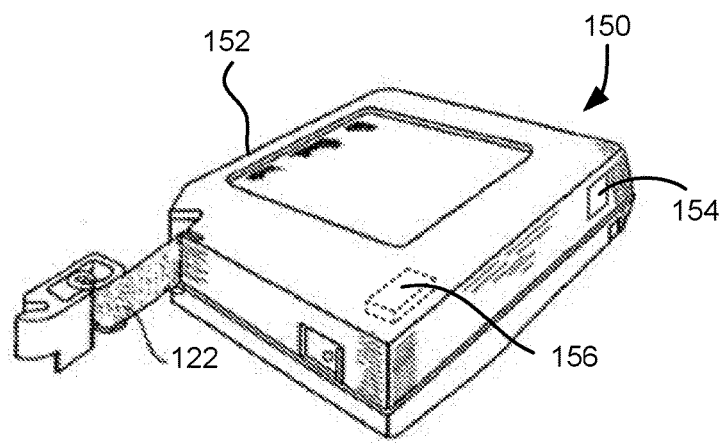
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
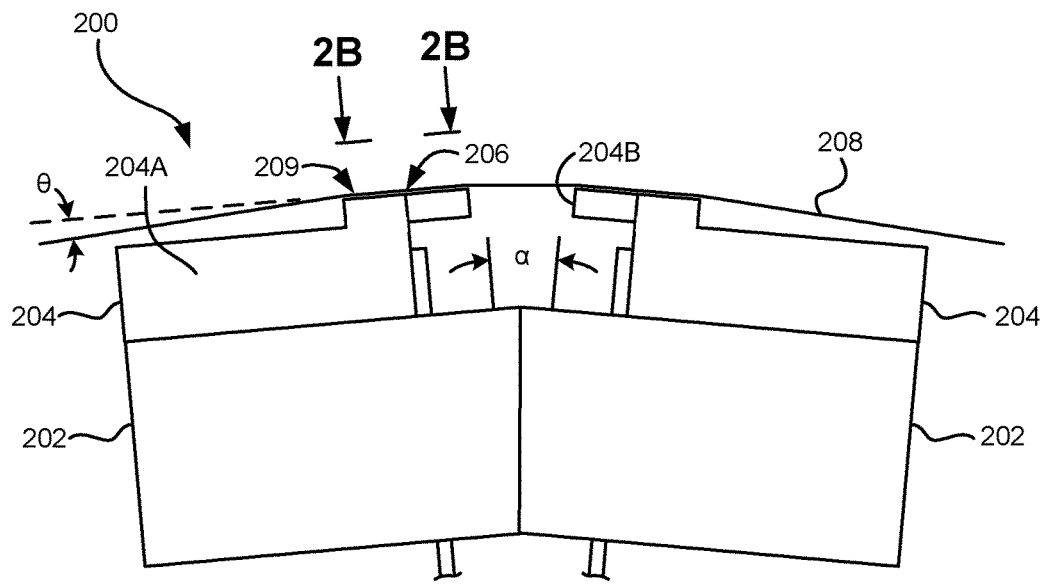
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
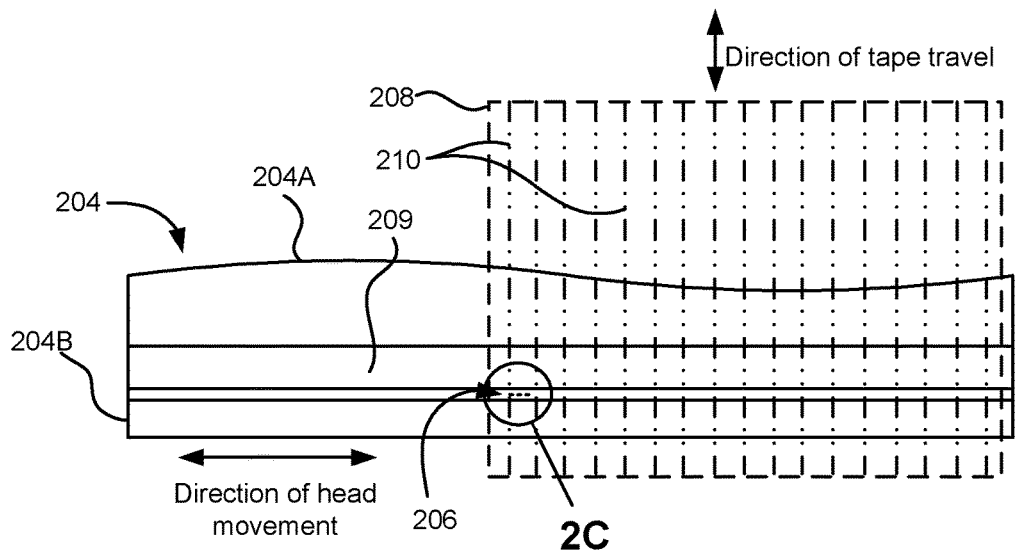
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
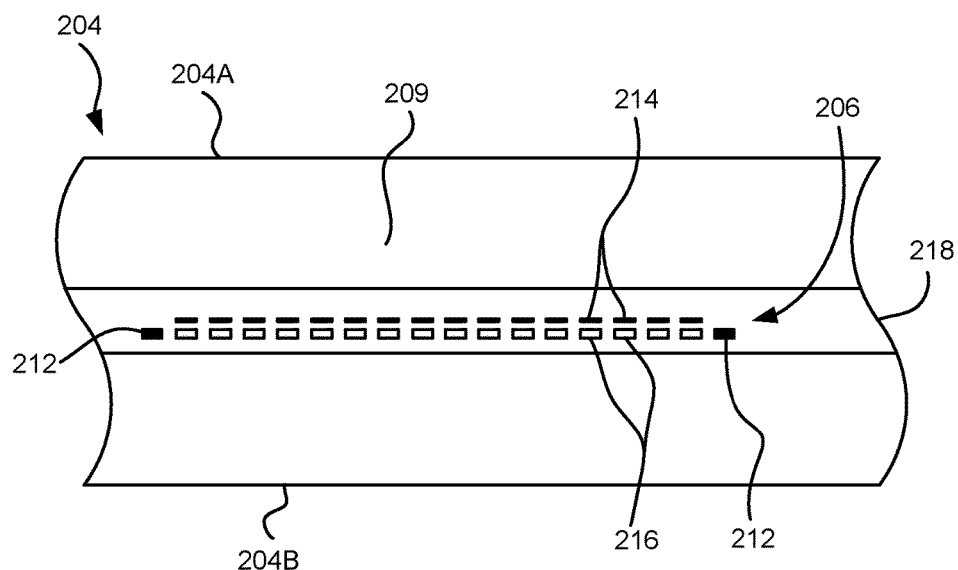
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
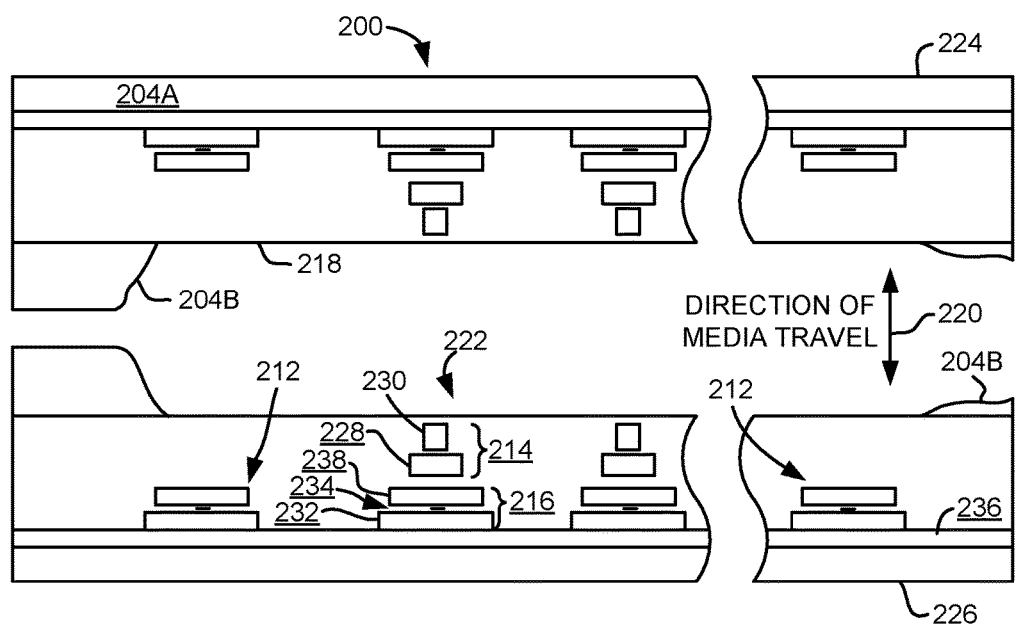
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading.

Each of the writers of a first write module in a conventional W-R-W head are often aligned along the same data tracks as a corresponding writer of a second write module of the conventional W-R-W head. Accordingly, each of the writers of the conventional first write module would write to the same respective data tracks as the correspondingly paired writer of a second write module, if the writers of both modules were activated simultaneously. Embodiments described herein include implementing actuators in magnetic tape drives for the selective shifting of one or more modules to enable simultaneous writing by writers of different write modules to different data tracks.

Figure 5:
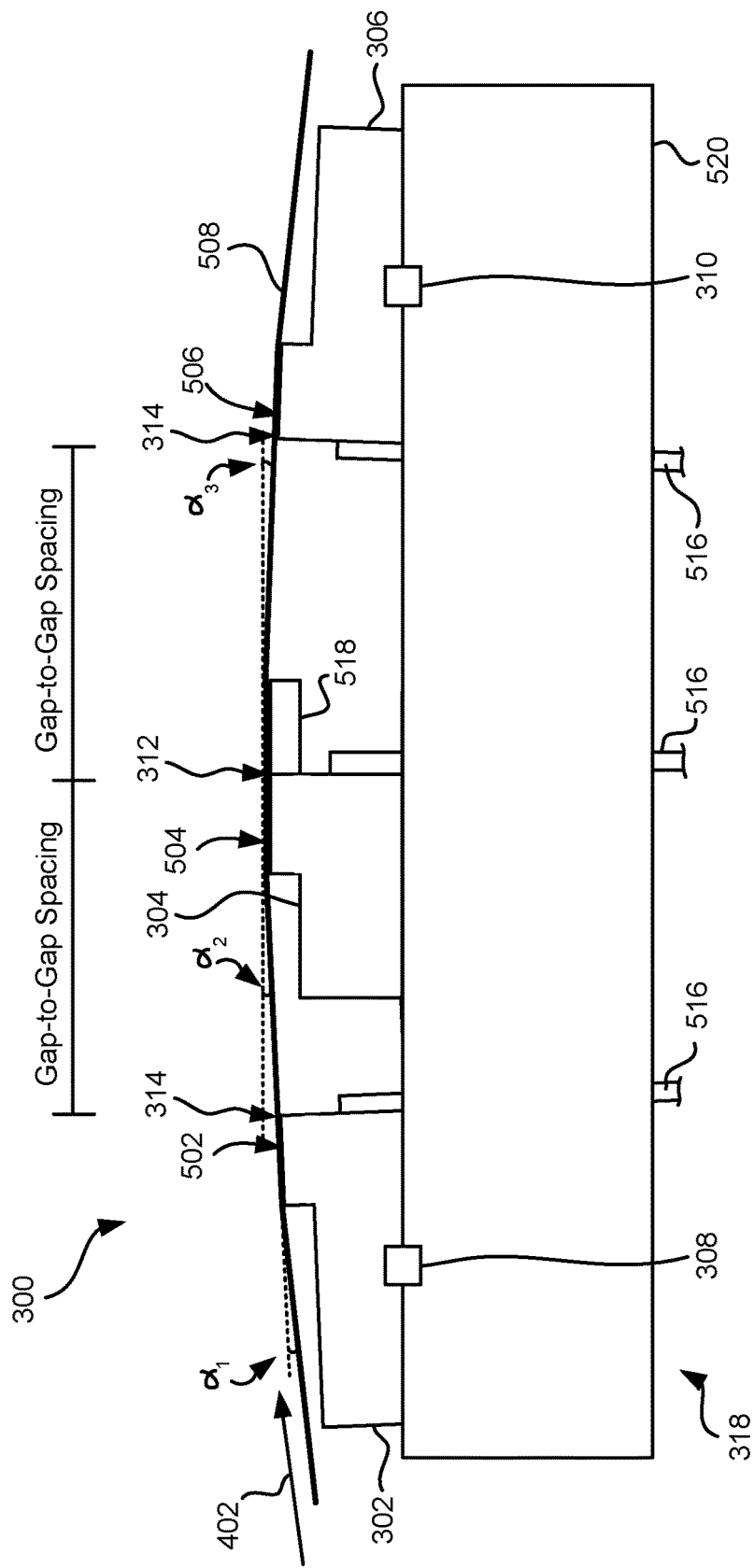
FIG. 5 is a side view of a magnetic tape head with three modules and actuators, in a tangent (angled) configuration.

FIGS. 3-5 depict a system 300 in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

Referring now to FIG. 3, system 300 includes an apparatus 318. The apparatus 318 may be the system 300 or a portion thereof.

Apparatus 318 includes a first outer module 302 having an array of writers 314, and a second outer module 306 having an array of writers 314.

Apparatus 318 also includes an inner module 304 positioned between the outer modules 302, 306. The inner module 304 may have an array of readers 312.

Variations of a multi-module head include arrangements in which one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify a few of the many possible embodiments of the present invention. One skilled in the art apprised with the teachings herein will appreciate how permutations of the present description may apply to various configurations other than a W-R-W configuration.

A magnetic recording medium, e.g., a magnetic recording tape, hereafter referred to as "tape," may be passed over each of the modules 302, 304, 306 in a first direction 316. It should be noted that the tape is not illustrated in FIGS. 3-4 for simplicity; however, the tape may be seen in FIG. 5, which illustrates a partial tape bearing surface view of system 300.

Apparatus 318 includes a first actuator 308 for shifting the first outer module 302. According to various embodiments, the first actuator 308 may shift the first outer module 302, relative to the inner module 304, in a cross-track direction, e.g., a direction about orthogonal to the first direction 316. The shift may be about one half of a center-to-center pitch 322 of the writers 314 of the first outer module 302 when writing in a direction in which the second outer module 306 is the leading module. To clarify, the leading module may be the first module the tape encounters when traveling in a given direction, e.g., the second outer module 306 is the leading module in FIG. 3 (with respect to tape traveling in the first direction 316).

Although the first outer module 302 is shifted about one half of a center-to-center pitch 322 of the writers 314 of the first outer module 302 in the present embodiment, according to other embodiments, the first actuator 308 may shift the first outer module 302 to some other position whereby the writers 314 of the first outer module 302 write data tracks 320 in a different location than the data tracks 320 that the writers 314 of the second outer module 304 are positioned to write simultaneously therewith.

Actuators described in this and other embodiments described herein may include any type of conventional actuator. According to various embodiments, the first actuator 308 may include, e.g., a worm screw, a piezo stack, a microscopic voice coil magnet assembly, a micro eletro mechanical structure (MEMS) device, etc. The first actuator 308 may additionally and/or alternatively include a biasing mechanism, e.g., a spring, which may be used to retract the outer module(s) 302, 306 from a most previous shifting motion to a nominal position. Actuator springs will be described in greater detail elsewhere herein, e.g., see FIGS. 8-9B.

Shifting the first outer module 302, relative to the inner module 304, in a cross-track direction may allow the writers of the first outer module 302 and the second outer module 306 to simultaneously write separate data tracks, at twice the rate achievable when only one of the modules is used. In other words, shifting the first outer module 302 in the system 300 of FIG. 3 may allow the 16 total writers of the outer modules 302, 306 to write 16 separate data tracks on a magnetic recording tape that is passed over the writers 314. These 16 separate data tracks include 8 more written data tracks than would be written if the first outer module 302 were not shifted by the actuator 308. This is because, as previously described, in the un-shifted position, the writers 314 of the first outer module 302 align with writers 314 of the second outer module 306 along the first direction 316 and the writers 314 thereby are only able to write 8 data tracks (in the present example). Likewise, where each module has an array of 32 writers, the shift may correspond to a simultaneous writing potential of 64 data channels as opposed to 32 data channels.

Referring now to FIG. 4, the tape may be passed over each of the modules 302, 304, 306 in a second direction 402. The second direction 402 may be substantially opposite the first direction 316 of FIG. 3.

The second actuator 310 may shift the second outer module 306. According to various embodiments, the second actuator 310 may shift the second outer module 306 relative to the inner module 304. The shift may be about one half of a center-to-center pitch 404 of the writers 314 of the second outer module 306 when writing in the direction 402 in which the first outer module 302 is the leading module, or some other distance.

Shifting the second outer module 306, relative to the inner module 304, in the cross-track direction may allow each of the writers 314 of the first outer module 302 and the second outer module 306 to simultaneously write separate data tracks in the second direction 402 of tape travel.

It should be noted that in FIGS. 3 and 4, the dashed lines "320" represent data tracks 320 that may be written to a tape that passes over the modules 302, 304, 306. The data tracks 320 are written by the writers 314 of both outer modules 302, 306. As shown in FIGS. 3-4, preferably the tracks written by the writers 314 of the leading module, as determined by tape travel direction, are aligned with the readers 312 of the inner module 304, thereby allowing read-while-write verification of the data tracks written by the leading module. While the tracks written by the trailing module are not immediately read-verified in the embodiment shown in FIGS. 3-4, the data may be verified later, or simply not verified.

The apparatus 318 may include a drive mechanism to pass a magnetic recording tape over each of the modules 302, 304, 306. Apparatus 318 may also include a controller electrically coupled to the readers 312 and writers 314. In the present illustrative embodiment, the controller may be configured to read-verify tracks written by writers 314 of the outer modules 302, 306 using signals from the readers 312 of the inner module 304. An illustrative drive and controller are described elsewhere herein, e.g., see FIG. 1A.

As is illustrated in FIG. 5, system 300 may include three cables 516 that enable both conventional bi-directional read-while-write writing of 8 data tracks, and simultaneous writing of 16 data tracks. Accordingly, the first actuator 308 desirably enables an increase in the number of available write channels without the need for extra head cables. This is especially desirable because adding extra cables may undesirably crowd the tight and compact spatial constraints in a drive; and moreover, the stiffness of the additional cables would be expected to adversely affect the performance of the track following actuator. In comparison, an implemented first actuator 308, and even an additionally implemented second actuator (as will be described elsewhere herein), may preferably be very small in size.

It should be noted that although sixteen data tracks 320 corresponding to sixteen writers, are illustrated in FIG. 3, system 300 may include any number of data channels according to other embodiments. For example, according to one approach, the system 300 may include 32 writers. According to another approach, the system 300 may include 32 writers. According to yet another approach, the system 300 may include 64 writers. Moreover, the number of readers of the inner module 304 relative to the number of writers of the outer modules 302, 306 may vary, depending on the embodiment.

According to various embodiments, apparatus 318 may additionally and/or alternatively include a skew compensation actuator (not shown). As tape is passed over the modules 302, 304, 306, the skew compensation actuator may rotate the modules 302, 304, 306 to compensate for tape skew.

According to other embodiments, the modules 302, 304, 306 may be coupled to a conventional two-stage actuator, e.g., a coarse and fine track following two-stage actuator, with the first and second actuators 308, 310 providing the aforementioned further movement of the respective module. In various embodiments, a skew following function may also be enabled if desirable.

FIG. 5 illustrates a partial tape bearing surface view of system 300 in accordance with one embodiment. The modules 302, 304, 306 each have a tape bearing surface 502, 504, 506 respectively, which may be flat, contoured, etc. Note that while the term "tape bearing surface" appears to imply that the tape 508 is in physical contact with the tape bearing surface, this is not necessarily the case. Rather, only a portion of the tape 508 may be in contact with the tape bearing surface, constantly or intermittently, with other portions of the tape riding (or "flying") above the tape bearing surface on a layer of air, sometimes referred to as an "air bearing". The first outer module 302 will be referred to as the "leading module 302" in the descriptions of FIG. 5 as it is the first module encountered by the tape 508 in a three module design for tape moving in the second direction 402. The second outer module 306 will be referred to as the "trailing module 306". The trailing module 306 follows the inner module 304 and is the last module seen by the tape 508 in a three module design. Note that the outer modules 302, 306 will alternate as leading modules, depending on the direction of travel of the tape 508.

In one embodiment, the tape bearing surfaces 502, 504, 506 of the modules 302, 304, 306 lie along planes slightly angled with respect to each other, and the tape bearing surface 504 of the inner module 304 is above the tape bearing surfaces 502, 506 of the leading and trailing modules 302, 306. As described below, this has the effect of creating the desired wrap angle $\alpha 2$ of the tape 508 relative to the tape bearing surface 504 of the inner module 304.

Depending on tape tension and stiffness, it may be desirable to angle the tape bearing surfaces of the outer modules 302, 306 relative to the tape bearing surface of the inner module 304. In FIG. 5, the modules are in a tangent or nearly tangent (angled) configuration. Particularly, the tape bearing surfaces of the outer modules are about parallel to the tape at the desired wrap angle $\alpha 2$ of the second outer module. In other words, the planes of the tape bearing surfaces 502, 506 of the outer modules are oriented at about the desired wrap angle $\alpha 2$ of the tape 508 relative to the inner module 304.

The inner wrap angle $\alpha 2$ on the side of the inner module 304 receiving the tape (leading edge) and the inner wrap angle $\alpha 3$ on the trailing edge of the inner module 304 may vary depending on the embodiment. In preferred approaches, the wrap angles $\alpha 2$, $\alpha 3$ are adjusted such that the tape 508 is passed over the tape bearing surfaces 502, 506 of the leading and trailing modules 302, 306 such that each of the writers 314 of such modules 302, 306 may simultaneously write separate data tracks.

As described elsewhere herein (see FIGS. 3-4) to enable the writers 314 of the leading and trailing modules 302, 306 to simultaneously write separate data tracks, according to various embodiments, a first actuator 308 may shift the leading module 302 relative to the inner module 304, in a cross-track direction by about one half of a center-to-center pitch of the writers 314 of the leading module 302. Likewise, the second actuator 310 may shift the trailing module 306 relative to the inner module 304, in a cross-track direction by about one half of a center-to-center pitch of the writers 314 of the trailing module 306.

The actuators 308, 310 may reside on and/or contact a support 520 of any type that would become apparent to one skilled in the art upon reading the present disclosure. In one approach, the support may be a conventional head carriage, modified to accommodate the actuators 308, 310.

Writing and reading functions may be performed by different modules 302, 304, 306 at any given time. In one embodiment, the inner module 304 includes a plurality of data readers 312 and optional servo readers (not shown) but no writers. The leading and trailing modules 302, 306 include a plurality of writers 314 and no data readers, with the exception that the leading and trailing modules 302, 306 may include optional servo readers. The servo readers may be used to position the head during reading and/or writing operations. The servo reader(s) on each module 302, 304, 306 are typically located toward the ends of the arrays of readers or writers. Note that other embodiments described herein may or may not include servo readers, e.g., of conventional type, adjacent one or more of the arrays.

In some embodiments, the inner module 304 has a closure 518, while the leading and trailing modules 302, 306 do not have a closure. Where there is no closure, preferably a hard coating is added to the outer modules 302, 306. One preferred coating is diamond-like carbon (DLC). In other approaches, the outer modules 302, 306 each have a closure.

It should be noted that apparatus 318 may according to other embodiments be used where modules are configured in an overwrap configuration. Such embodiments will be described elsewhere herein, e.g., see FIG. 11.

Figure 6:
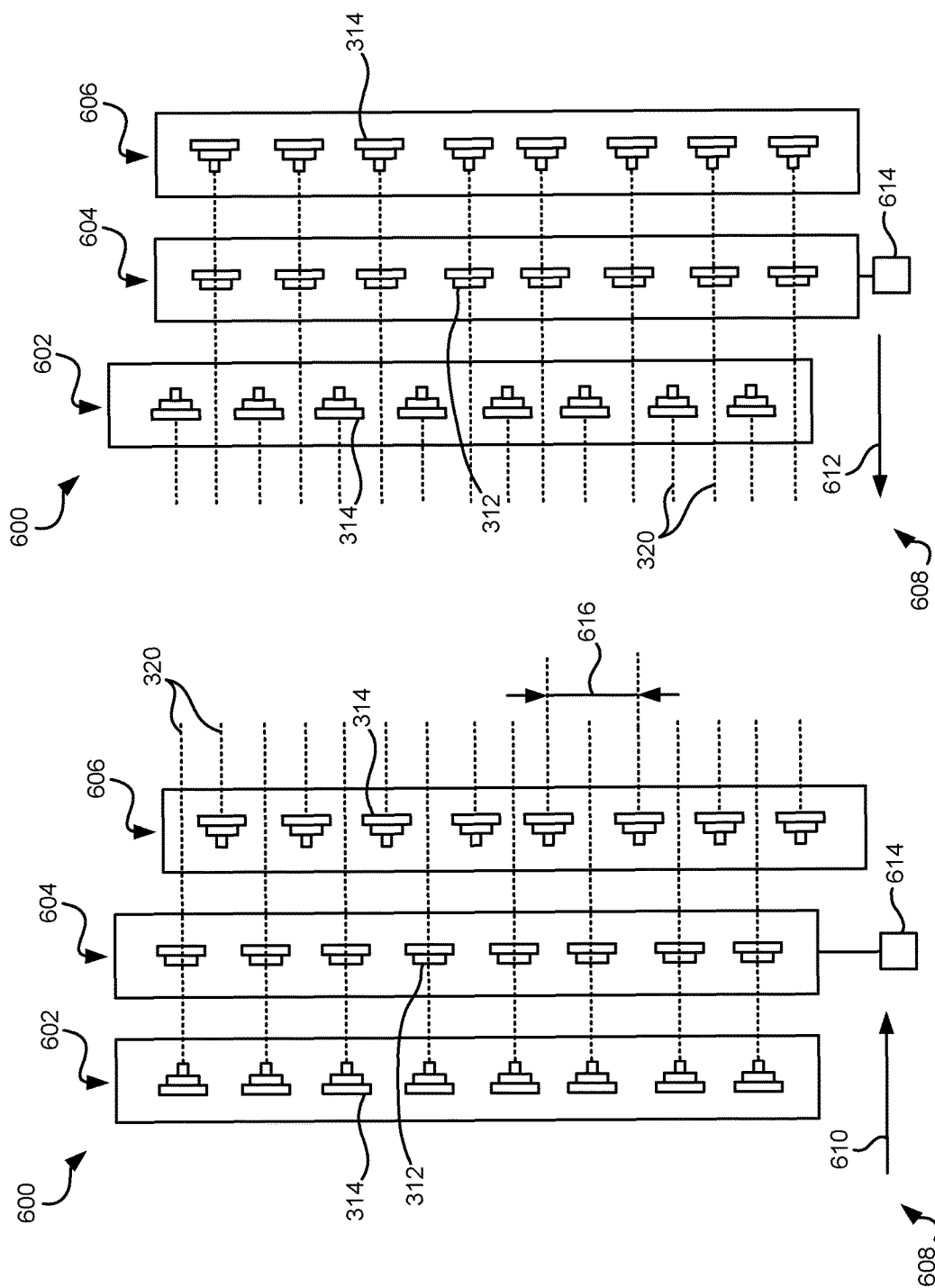
FIG. 6A is a partial tape bearing surface view of a magnetic head having a write-read-write configuration, where the inner module is shifted via an actuator, in accordance with one embodiment.
FIG. 6B is a partial tape bearing surface view of the magnetic head of FIG. 6A, where the inner module is shifted via the actuator.
Figure 7:
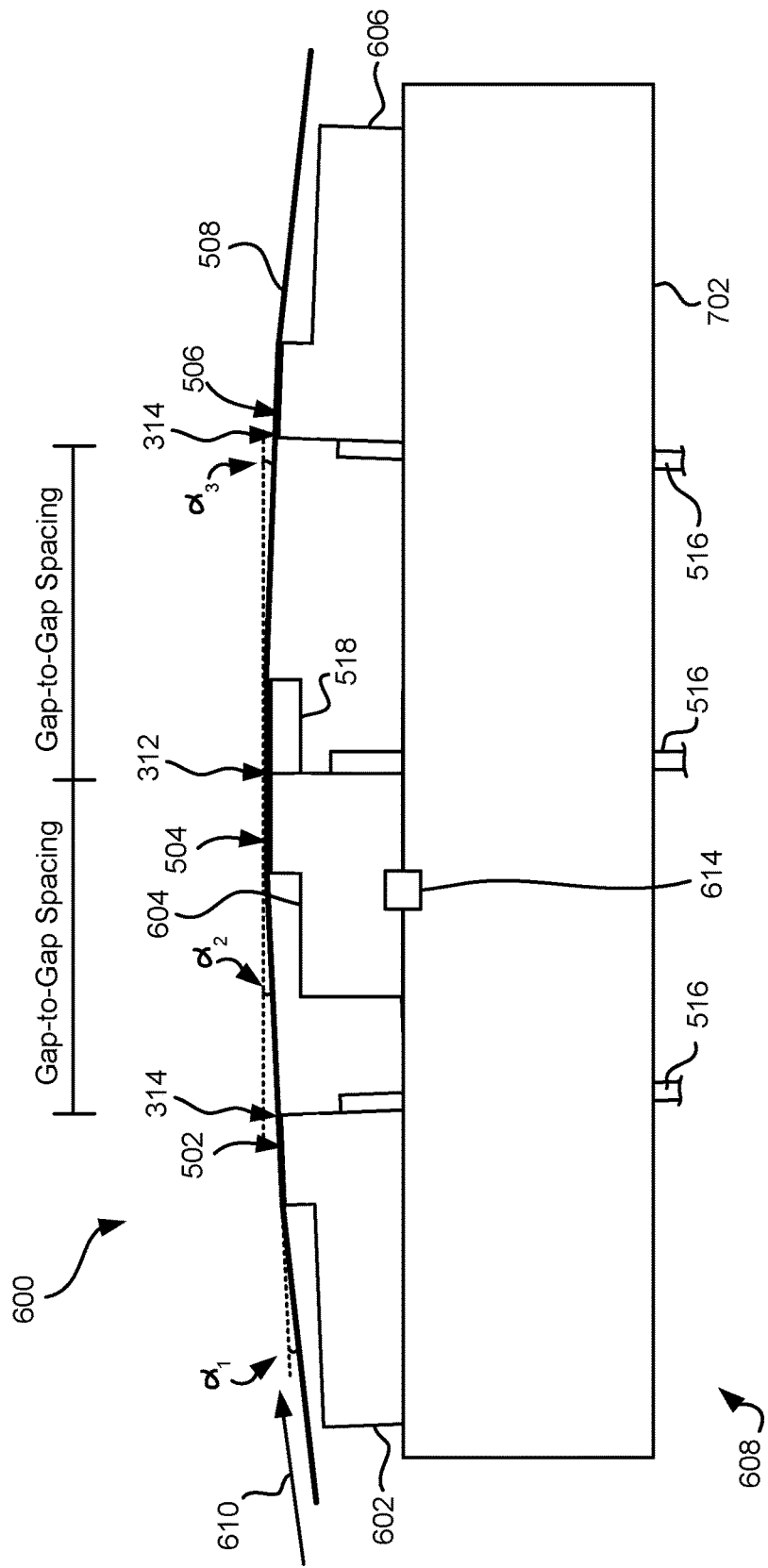
FIG. 7 is a side view of a magnetic tape head with three modules and an actuator, in a tangent (angled) configuration.

In an alternate embodiment, an actuator may additionally and/or alternatively be configured to shift the inner module of a multi-module head, e.g., see FIGS. 6A-7.

FIGS. 6A-7 depict a system 600 in accordance with one embodiment. As an option, the present system 600 may be implemented in conjunction with features from any other embodiment listed herein, such as those described with reference to the other FIGS. Of course, however, such system 600 and others presented herein may be used in various applications and/or in permutations which may or may not be specifically described in the illustrative embodiments listed herein. Further, the system 600 presented herein may be used in any desired environment.

It should be noted that various components of system 600 are similar to one or more components of system 300 of FIGS. 3-5. Accordingly, one or more components of system 600 may share a common component numbering with one or more components of system 300, and/or other systems described elsewhere herein.

Referring now to FIG. 6A, system 600 includes an apparatus 608. The apparatus 608 may be a portion of the system 600. Apparatus 608 includes a first outer module 602 having an array of writers 314. Apparatus 608 may also include a second outer module 606 having an array of writers 314.

According to one embodiment, as illustrated in FIGS. 6A-6B, the writers 314 of the second outer module 606 may be offset from the writers 314 of the first outer module 602 in a cross-track direction by about one half of a center-to-center pitch 616 of the writers 314 of the second outer module 606. According to various embodiments, the positions of the first and second outer modules 602, 606 may be fixed relative to one another.

Apparatus 608 may also include an inner module 604 positioned between the outer modules 602, 606. The inner module 604 may have an array of readers 312.

Apparatus 608 may include an actuator 614 for shifting the inner module 604, relative to the outer modules 602, 606. The actuator 614 for shifting the inner module 604 may selectively align the readers 312 with the writers 314 the leading outer module, depending on tape travel direction. In response to selectively aligning the readers 312 with the writers 314 of the leading outer module, during writing, the readers 312 of the inner module 304 may read-verify the data tracks written by the leading outer module.

Read verification in each tape travel direction will now be further detailed using a descriptive comparison of FIGS. 6A-6B. Referring first to FIG. 6A, the first outer module 602 is the leading write module and the second outer module 606 is the trailing write module in the first tape travel direction 610, as shown in FIG. 6A. In response to an instruction to move the tape in the first tape travel direction 610, actuator 614 preferably shifts the inner module 604 to a position that selectively aligns the readers 312 of the inner module 604 with the writers 314 of the first outer module 602. During tape travel in the first direction 610, this selective alignment allows the writers 314 of the first outer module 602 to write data tracks, and then the readers 312 of the inner module 604 to read-verify those data tracks as the written data tracks pass over the readers 312.

In contrast, referring now to FIG. 6B, the second outer module 606 is the leading write module as the tape moves in the second tape travel direction 612. In response to an instruction to move the tape in the second tape travel direction 612, actuator 614 preferably shifts the inner module 604 to a position that selectively aligns the readers 312 of the inner module 604 with the writers 314 of the second outer module 606. During tape travel in the second direction 612, this selective alignment allows the writers 314 of the second outer module 606 to write data tracks, and then the readers 312 of the inner module 604 to read-verify those data tracks as the written data tracks pass over the readers 312.

According to various embodiments, the data tracks written by the trailing one of the outer modules 602, 606 may not be read-verified during a particular direction of tape travel. In such embodiments, the data tracks written by the trailing one of the outer modules 602, 606 may however be read-verified in a second pass of the magnetic tape over the modules 602, 604, 606. For example, referring again to FIG. 6A, the data tracks written by the trailing outer module 606 may not be read-verified as the tape travels in the first direction 610, e.g., during a first pass of the magnetic tape over the modules 602, 604, 606. The data tracks written by the trailing outer module 606 during a first passing of the tape over the modules 602, 604, 606 may however be read-verified by the readers 312 of the inner module 604 during a second pass of the magnetic tape over the modules 602, 604, 606, e.g., at the request of a user or host, when the drive has no read or write requests pending (e.g., idle time), etc.

Referring now to FIG. 7, a side view of the modules 602, 604, 606 of system 600 is illustrated in accordance with one embodiment. In FIG. 7, the modules are in a tangent or nearly tangent (angled) configuration.

A tape 508 is illustrated traveling in a first tape travel direction 610 in FIG. 7. Consequently, the first outer module 602 is the leading write module. Actuator 614 may shift the inner module 604 to a position that selectively aligns the readers 312 of the inner module 604 with the writers 314 of the first outer module 602, thereby enabling read-verification of data tracks written by writers 314 of the first outer module 602.

The actuator 614 may reside on and/or contact a support 702 of any type.

Figure 8:
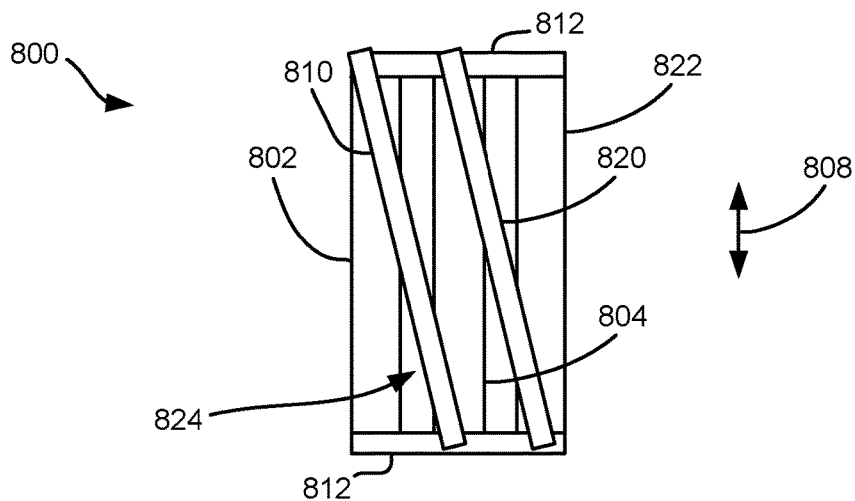
FIG. 8 is a bottom view of modules and an actuator, in accordance with one embodiment.
Figure 9A:
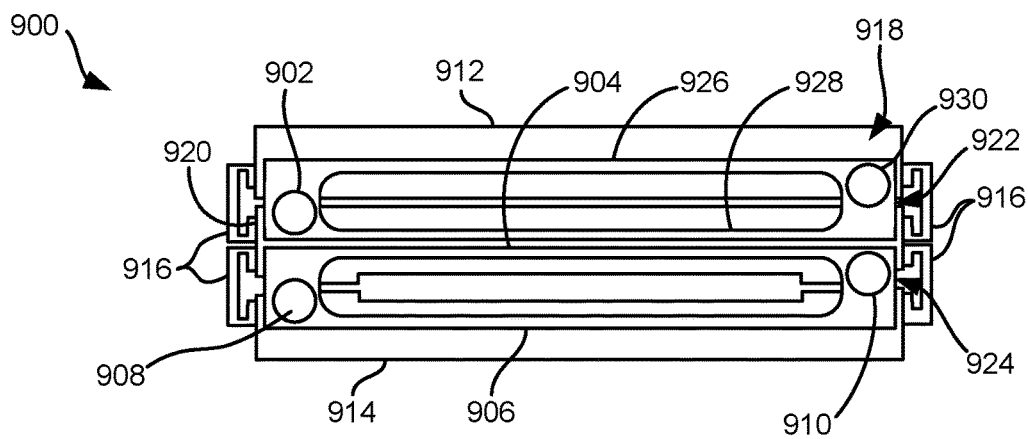
FIGS. 9A-9B are bottom and side views, respectively, of modules of a magnetic tape head according to one embodiment.
Figure 9B:
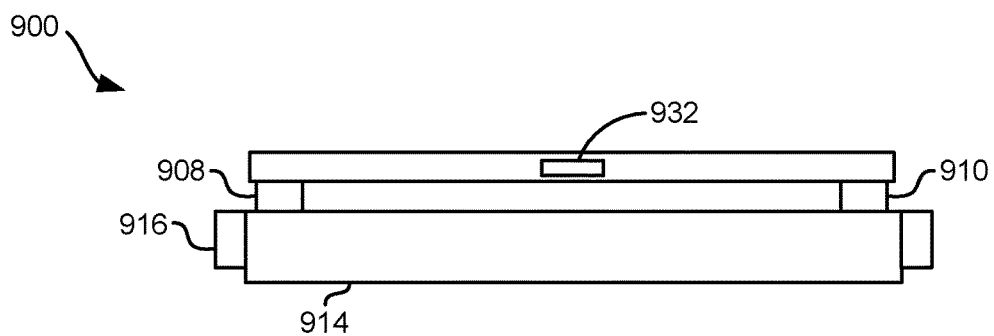

FIG. 8-9B depict systems 800, 900 in accordance with various embodiments whereby illustrative actuators shift one or more modules of a three module head by exerting a force on one or more other modules. As an option, the present systems 800, 900 may be implemented in conjunction with features from any other embodiment listed herein, such as those described with reference to the other FIGS. Of course, however, such systems 800, 900 and others presented herein may be used in various applications and/or in permutations which may or may not be specifically described in the illustrative embodiments listed herein. Further, the systems 800, 900 presented herein may be used in any desired environment.

Referring now to FIG. 8, system 800 includes an actuator 824. Actuator 824 may be coupled to a plurality of modules, e.g., see outer modules 802, 822 and an inner module 804 of system 800.

Note that FIG. 8 illustrates a bottom view of the modules 802, 804, 822 and actuator 824, e.g., readers and writers of the modules 802, 804, 822 may reside on an opposite side of the modules 802, 804, 822 not visible in FIG. 8.

Actuator 824 includes two preferably semi-rigid beams 810, 820. Each of the beams 810, 820 may be coupled to two adjacent modules 802 and 804, 804 and 822, respectively, at or near opposite and alternate ends of the modules 802, 804, 822. The coupling between the beams 810, 820 and the modules 802, 804, 822 may be established using any conventional coupling type. According to various embodiments, the coupling may be established via, e.g., an adhesive, pins, solder, etc.

Actuator 824 may selectively cause a movement of each outer module 802, 822 relative to the inner module 804 in an allowed direction of movement by exerting a force on the modules to which it is attached. For example, the outer module 802 may be shifted in a first direction 808 in response to a force being exerted on both the outer module 802 and the inner module 804 by beam 810. According to another example, the outer module 822 may be shifted in the first direction 808 in response to a force being exerted on both the outer module 822 and the inner module 804 by beam 820.

To hold the modules 802, 804, 822 in a desired position while allowing this motion, the modules 802, 804, 822 may be connected to one another by one or more springs 812 or other component(s) that allows flexing in the direction of motion. Note that the allowed direction of movement may be straight, or have a slight arc, depending on the particular design adopted for a given embodiment.

According to various embodiments, the actuator 824 may be a thermal actuator. In such embodiments, placing the coupling closer to the ends of the modules 802, 804, 822 may allow for the greatest amount of motion when using the thermal actuator.

In one approach, the actuator 824 comprises a preferably semi-rigid body, e.g., with beams 810, 820 coupled to opposite ends of each adjacent module pair 802 and 804, 804 and 822. The beams 810, 820 may be constructed of aluminum or other material with a coefficient of thermal expansion suitable for generating the desired expansion and/or contraction thereof. The temperature of all or a portion of the actuator 824 may be adjusted to induce the expansion and/or contraction thereof. One or both of the beams 810, 820 may be heated via any suitable mechanism, including resistive (Joule) heating of the beams 810, 820 themselves or of heating elements coupled thereto, raising of an ambient temperature, inductive heating, laser-induced heating, etc., The beams 810, 820 may be cooled via any suitable mechanism, including by a Peltier device, by reducing or terminating application of heat thereto, etc. When one or both of the beams 810, 820 may be heated, the thermal expansion creates a force that displaces one module with respect to another, e.g., module 802 relative to module 804 and/or module 822 relative to module 804, and flexes the springs 812.

Note that a second actuator of any type known in the art may be provided to tilt the assembly to achieve the desired pitch of the transducers relative to the tape and/or for skew compensation. The extent of the relative movement needed to align the modules 802, 804, 822 may be dependent upon a degree of tilting.

In another embodiment, the actuator 824 may be made of piezoelectric material such as PZT, or comprise multiple cells of piezoelectric material. In this case, a voltage is applied to the actuator 824 to create relative motion between the modules. In general, any actuator material know in the art can be used, such as shape memory alloys, bi-metallic strips, piezoelectric materials, etc.

Referring now to FIGS. 9A-9B, system 900 includes an actuator 918. Actuator 918 may be positioned on over a plurality of modules, e.g., see first and second outer modules 912, 914 and an inner module 920 of system 900. Note that FIGS. 9A-9B are bottom and side views, respectively, of the modules 912, 914, 920 and actuator 918, e.g., readers and/or writers of the modules 912, 914, 920 may reside on an opposite side of the modules 912, 914, 920 as that shown in FIG. 9A.

As depicted in FIGS. 9A and 9B, the actuator 918 may include a first hollow frame 922 and a second hollow frame 924. The first hollow frame 922 may have at least two arms 926, 928 extending between points of coupling 902, 930, which couple the actuator 918 to the first outer module 912 and the inner module 920. Similarly, the second hollow frame 924 may have at least two arms 904, 906 extending between points of coupling 908, 910, which couple the actuator 918 to the second outer module 914 and the inner module 920.

The openings in the first and second hollow frames 922, 924 provide access to the center of the modules 912, 914, 920 for attaching a cable. The springs 916 as depicted are "C" shaped pieces attached to the ends of the modules 912, 914, 920, but could have any suitable shape.

As illustrated in FIG. 9B, heating elements 932 may be placed on each of the arms 926, 928 of the first frame 922 and/or each of the arms 904, 906 of the second frame 924, such that any of the arms 926, 928, 904, 906 can be heated evenly and selectively, e.g., simultaneously in pairs. The actuator 918 in this or any other embodiment can be heated with any number of different techniques, such as passing current through the beam directly, a heating element on the beam, wrapping the beam in current carrying wire, etc. In addition or alternatively, the beam may be cooled using any suitable technique or mechanism, including those listed above.

The effectiveness of this thermal actuator can be increased by selecting a design which minimizes the heat transferred to the modules 912, 914, 920. In such designs, attachment pins or adhesives may be comprised of a thermally insulating material. Likewise, a method of insulating the beam from the modules 912, 914, 920, through use of a thermally insulating material at the attachment points may be used in any of the other embodiments. The insulation minimizes heating of the modules 912, 914, 920 and results in a maximal displacement for a given temperature.

Figure 10:
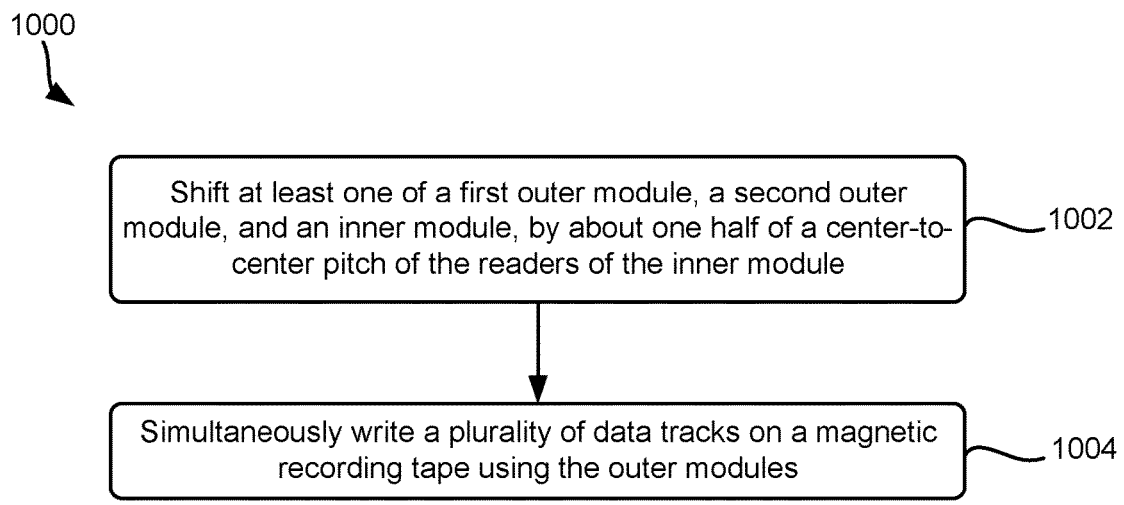
FIG. 10 is a flowchart of a method, in accordance with one embodiment.

FIG. 10 depicts a method 1000 for using an actuator to selectively shift modules of a three module magnetic recording head and thereby enable simultaneous writing by multiple modules of the magnetic recording head, in accordance with one embodiment. As an option, the present method 1000 may be implemented to computer rack systems such as those shown in the other FIGS. described herein. Of course, however, this method 1000 and others presented herein may be used to establish security and selective access for a wide variety of devices and/or purposes which may or may not be related to the illustrative embodiments listed herein. Further, the methods presented herein may be carried out in any desired environment. Moreover, more or less operations than those shown in FIG. 10 may be included in method 1000, according to various embodiments. It should also be noted that any of the aforementioned features may be used in any of the embodiments described in accordance with the various methods.

Method 1000 may be performed as a tape drive-implemented method in a tape drive. As described in various embodiments elsewhere herein, the tape drive may include at least a first outer module having an array of writers, a second outer module having an array of writers, and an inner module positioned between the outer modules, where the inner module has an array of readers.

Operation 1002 of method 1000 includes shifting at least one of the modules by about one half of a center-to-center pitch of the readers of the inner module.

Operation 1004 of method 1000 includes simultaneously writing a plurality of data tracks on a magnetic recording tape using the outer modules. The data tracks written by a trailing one of the outer modules may be offset in a cross-track direction from the data tracks written by a leading one of the outer modules. As described elsewhere herein, simultaneously writing a plurality of data tracks on a magnetic recording tape using the outer modules may utilize the multiple writer modules for simultaneously writing two times the number of data tracks, as well as allowing read-verification of at least half of the written tracks.

Figure 11:
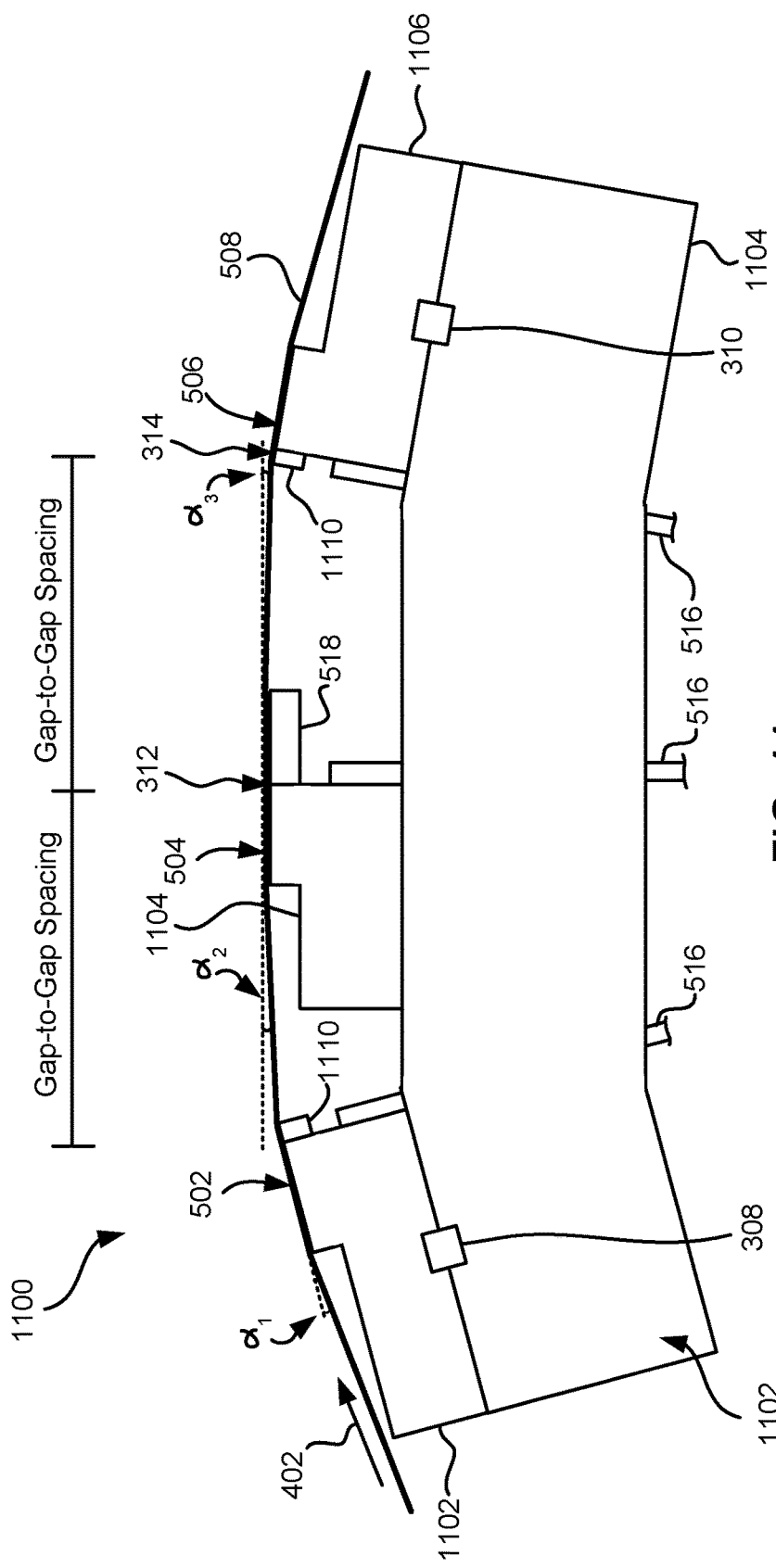
FIG. 11 is a side view of a magnetic tape head with three modules in an overwrap configuration.

Referring now to FIG. 11, a side view of modules 1102, 1104, 1106 are illustrated positioned in an overwrap configuration of a multi-module head system 1100 in accordance with one embodiment. As an option, the present system 1100 may be implemented in conjunction with features from any other embodiment listed herein, such as those described with reference to the other FIGS. Of course, however, such system 1100 and others presented herein may be used in various applications and/or in permutations which may or may not be specifically described in the illustrative embodiments listed herein. Further, the system 1100 presented herein may be used in any desired environment.

It should be noted that various components of system 1100 are similar to one or more components of systems 300, 600 of FIGS. 3-5 and 6A-7. Accordingly, one or more components of system 1100 may share common component numbering with one or more components of other systems described elsewhere herein.

FIG. 11 illustrates an embodiment where the modules 1102, 1104, 1106 are in an overwrap configuration. Particularly, the tape bearing surfaces 502, 506 of the outer modules 1102, 1106 are angled slightly more than the tape 508 when set at the desired wrap angle α2 relative to the second outer module 1106. In this embodiment, the tape 508 does not pop off of the trailing module 1106, allowing the trailing module 1106 to be used for writing. A preferred embodiment has shortened closures 1110 that allow closer gap-to-gap separation between the modules.

A 32 channel version of a multi-module head system 1100 may use cables 516 having leads on the same or smaller pitch as current 16 channel piggyback LTO modules, or alternatively the connections on the module may be organ-keyboarded for a 50% reduction in cable span. Over-under, writing pair unshielded cables may be used for the writers, as well as integrated servo readers.

The outer wrap angles α1 may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle α1.

To assemble any of the embodiments described above, conventional u-beam assembly can be used. Accordingly, the mass of the resultant head may be maintained or even reduced relative to heads of previous generations. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 12A:
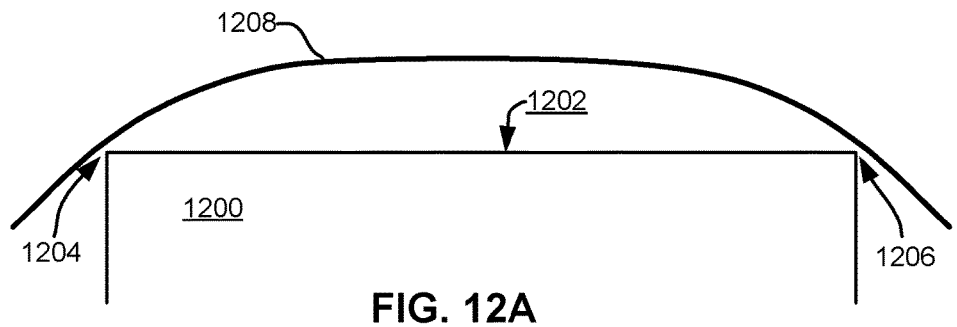
FIGS. 12A-12C are schematics depicting the principles of tape tenting.
Figure 12B:
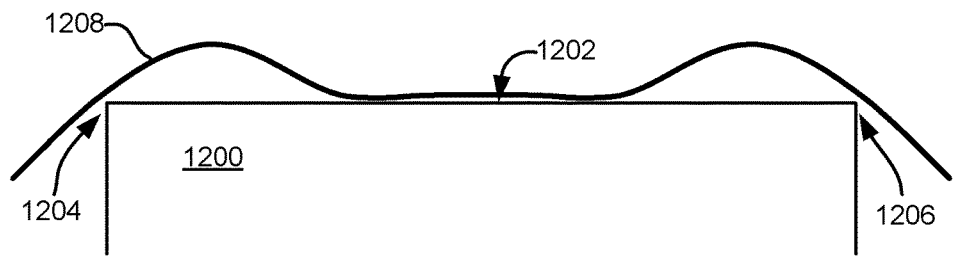
Figure 12C:
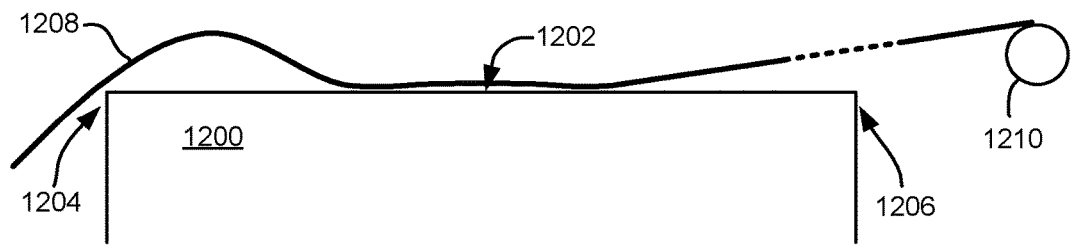

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 12A-12C illustrate the principles of tape tenting. FIG. 12A shows a module 1200 having an upper tape bearing surface 1202 extending between opposite edges 1204, 1206. A stationary tape 1208 is shown wrapping around the edges 1204, 1206. As shown, the bending stiffness of the tape 1208 lifts the tape off of the tape bearing surface 1202. Tape tension tends to flatten the tape profile, as shown in FIG. 12A. Where tape tension is minimal, the curvature of the tape is more parabolic than shown.

FIG. 12B depicts the tape 1208 in motion. The leading edge, i.e., the first edge the tape encounters when moving, may serve to skive air from the tape, thereby creating a subambient air pressure between the tape 1208 and the tape bearing surface 1202. In FIG. 12B, the leading edge is the left edge and the right edge is the trailing edge when the tape is moving left to right. As a result, atmospheric pressure above the tape urges the tape toward the tape bearing surface 1202, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 12C depicts how the subambient pressure urges the tape 1208 toward the tape bearing surface 1202 even when a trailing guide 1210 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 13:
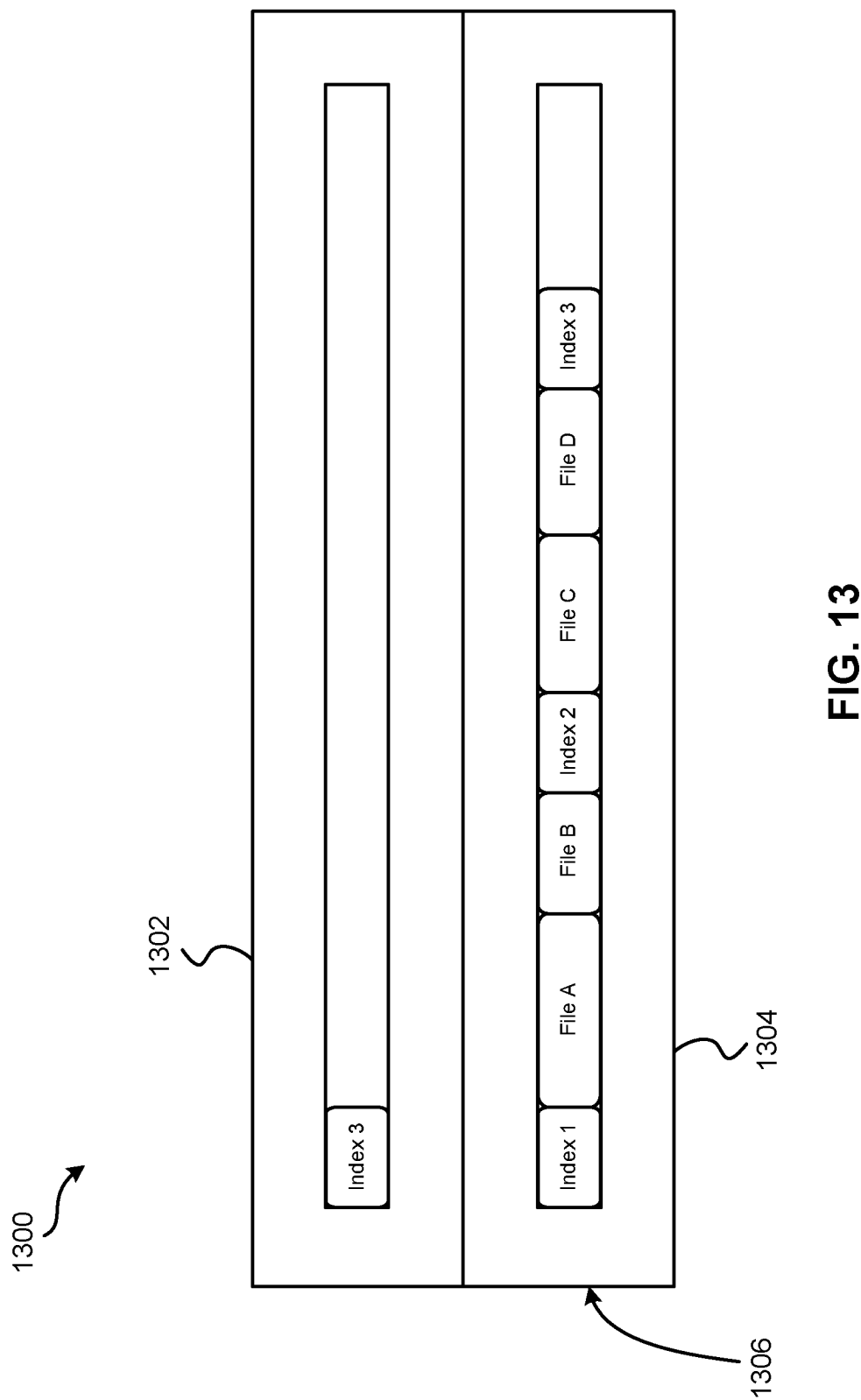
FIG. 13 is a representational diagram of files and indexes stored on a magnetic tape according to one embodiment.

Looking to FIG. 13, a magnetic tape 1300 having an index partition 1302 and a data partition 1304 is illustrated according to one embodiment. As shown, data files and indexes are stored on the tape. The LTFS format allows for index information to be recorded in the index partition 1302 at the beginning of tape 1306, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 13, a most recent version of metadata Index 3 is recorded in the index partition 1302 at the beginning of the tape 1306. Conversely, all three version of metadata Index 1, Index 2, Index 3 as well as data File A, File B, File C, File D are recorded in the data partition 1304 of the tape. Although Index 1 and Index 2 are old (e.g., outdated) indexes, because information is written to tape by appending it to the end of the previously written data as described above, these old indexes Index 1, Index 2 remain stored on the tape 1300 in the data partition 1304 without being overwritten.

The metadata may be updated in the index partition 1302 and/or the data partition 1304 differently depending on the desired embodiment. According to some embodiments, the metadata of the index partition 1302 may be updated in response to the tape being unmounted, e.g., such that the index may be read from the index partition when that tape is mounted again. The metadata may also be written in the data partition 1304 so the tape may be mounted using the metadata recorded in the data partition 1304, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. An apparatus, comprising:
a first outer module having an array of writers;
a second outer module having an array of writers;
an inner module positioned between the outer modules, the inner module having an array of readers; and a first actuator for shifting the first outer module, relative to the inner module, in a cross-track direction by about one half of a center-to-center pitch of the writers of the first outer module for selectively aligning and misaligning the writers of the first outer module with the readers of the inner module along a tape travel direction; and a controller electrically coupled to the readers and writers, the controller being configured to cause the writers of both outer modules to simultaneously write a plurality of data tracks on a magnetic recording tape.

2. An apparatus as recited in claim 1, comprising a second actuator for shifting the second outer module, relative to the inner module, by about one half of a center-to-center pitch of the writers of the second outer module for selectively aligning and misaligning the writers of the second outer module with the readers of the inner module along a tape travel direction.

3. An apparatus as recited in claim 1, comprising a skew compensation actuator for rotating the modules to compensate for tape skew.

4. An apparatus as recited in claim 1, further comprising:
a drive mechanism for passing a magnetic medium over the modules.

5. An apparatus as recited in claim 1, wherein the controller is configured to read-verify tracks written by the second outer module using signals from the readers of the inner module.

6. An apparatus as recited in claim 5, wherein the controller is configured to cause the writers of the first outer module to be offset in the cross-track direction from the readers of the inner module by about one half of the center-to-center pitch of the writers of the first outer module when read-verifying the tracks written by the second outer module.

7. An apparatus, comprising:
a first outer module having an array of writers;
a second outer module having an array of writers, the writers of the second outer module being offset from the writers of the first outer module in a cross-track direction by about one half of a center-to-center pitch of the writers of the second outer module, positions of the first and second outer modules being fixed relative to one another;
an inner module positioned between the outer modules, the inner module having an array of readers; and
an actuator for shifting the inner module, relative to the outer modules, for selectively aligning the readers with the writers of the outer modules depending on tape travel direction.

8. An apparatus as recited in claim 7, comprising a skew compensation actuator for rotating the modules to compensate for tape skew.

9. An apparatus as recited in claim 7, further comprising:
a drive mechanism for passing a magnetic medium over the modules; and
a controller electrically coupled to the readers and writers.

10. An apparatus as recited in claim 9, wherein the controller is configured to read-verify tracks written by a leading one of the modules using signals from the readers of the inner module.

11. A tape drive-implemented method in a tape drive having at least a first outer module having an array of writers, a second outer module having an array of writers, and an inner module positioned between the outer modules, the inner module having an array of readers, the method comprising:
shifting at least one of the modules by about one half of a center-to-center pitch of the readers of the inner module; and
simultaneously writing a plurality of data tracks on a magnetic recording tape using the outer modules, wherein the data tracks written by a trailing one of the outer modules are offset in a cross-track direction from the data tracks written by a leading one of the outer modules.

12. A method as recited in claim 11, wherein the positions of the first and second outer modules are fixed relative to one another.

13. A method as recited in claim 11, comprising shifting the second outer module, relative to the inner module, by about one half of a center-to-center pitch of the writers of the second outer module.

14. A method as recited in claim 11, comprising shifting the inner module, relative to the outer modules, for selectively aligning the readers with the writers of the outer modules depending on tape travel direction.

15. A method as recited in claim 11, comprising rotating the modules to compensate for tape skew.

16. A method as recited in claim 11, comprising, during the writing, read-verifying the data tracks written by the leading one of the outer modules using the readers of the inner module.

17. A method as recited in claim 16, where the data tracks written by the trailing one of the outer modules is not read-verified.

18. A method as recited in claim 16, comprising read-verifying the data tracks written by the trailing one of the outer modules in a second pass of the magnetic recording tape over the modules.

19. A method as recited in claim 16, comprising shifting the inner module relative to the outer modules for selectively aligning the readers of the inner module with the writers of one of the outer modules depending on tape travel direction.

* * * * *